United States Patent
Henderson et al.

(10) Patent No.: US 7,870,491 B1
(45) Date of Patent: Jan. 11, 2011

(54) SYSTEM AND METHOD FOR USER SUPPORT BASED ON USER INTERACTION HISTORIES

(75) Inventors: Kenneth Henderson, Folsom, CA (US); Terry F. LeClair, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 544 days.

(21) Appl. No.: 11/741,615

(22) Filed: Apr. 27, 2007

(51) Int. Cl.
  G06F 3/00 (2006.01)
  G06F 3/048 (2006.01)
(52) U.S. Cl. .................. 715/745; 715/783; 715/789
(58) Field of Classification Search .......... 715/745, 715/760, 776, 783, 789, 819, 820
  See application file for complete search history.

(56) References Cited

U.S. PATENT DOCUMENTS

| | | | |
|---|---|---|---|
| 4,905,163 A | 2/1990 | Garber et al. | |
| 4,964,077 A | 10/1990 | Eisen et al. | |
| 5,239,617 A | 8/1993 | Gardner et al. | |
| 5,485,544 A | 1/1996 | Nonaka et al. | |
| 5,848,396 A * | 12/1998 | Gerace | 705/10 |
| 6,233,570 B1 | 5/2001 | Horvitz et al. | |
| 6,262,730 B1 | 7/2001 | Horvitz et al. | |
| 6,286,005 B1 * | 9/2001 | Cannon | 705/7 |
| 6,289,317 B1 | 9/2001 | Peterson | |
| 6,300,950 B1 | 10/2001 | Clark et al. | |
| 6,625,267 B1 | 9/2003 | Graham et al. | |
| 7,194,685 B2 | 3/2007 | Morrison | |
| 7,225,407 B2 * | 5/2007 | Sommerer et al. | 715/738 |
| 7,376,910 B2 * | 5/2008 | Inui et al. | 715/797 |
| 7,523,191 B1 * | 4/2009 | Thomas et al. | 709/224 |
| 2002/0015056 A1 | 2/2002 | Weinlaender | |
| 2002/0118220 A1 | 8/2002 | Lui et al. | |
| 2005/0054381 A1 | 3/2005 | Lee et al. | |
| 2005/0066236 A1 | 3/2005 | Goeller et al. | |
| 2005/0118996 A1 | 6/2005 | Lee et al. | |
| 2006/0184410 A1 | 8/2006 | Ramamurthy et al. | |
| 2007/0050719 A1 | 3/2007 | Lui et al. | |
| 2007/0300174 A1 | 12/2007 | Macbeth et al. | |

OTHER PUBLICATIONS

"Timetag: The New Standard in Time Tracking" 2004, Timetag, Inc. pp. 1-2.
"Elite Professional Time and Expense Entry Solutions" http://www.thomsonelite.com/solutions, 2004, pp. 1-4.
"QuickBooks Time Tracker", Intuit, Inc., pp. 1-2, 2006.

(Continued)

*Primary Examiner*—Weilun Lo
*Assistant Examiner*—Truc T Chuong
(74) *Attorney, Agent, or Firm*—Gunnison, McKay & Hodgson, L.L.P.; Philip McKay

(57) ABSTRACT

In various embodiments, user support in computer software applications may be provided on the basis of user interaction histories. Critical points may be defined throughout the applications and the user interaction histories at these critical points may be stored and indexed for future retrieval. User interaction histories at these critical points may also be scored to determine, for example, whether the system should intervene. In some embodiments, when providing user support, an entity may access the user interaction history (e.g., using the index). The user interaction history may assist the entity in determining how to assist the system user at their current point in the application. In some embodiments, user support may be not limited to assisting the system user with a problem. For example, user support may include presenting a promotion or advertisement to the system user based on the user interaction history.

24 Claims, 12 Drawing Sheets

OTHER PUBLICATIONS

"QuickBooks Time Tracker" Whitepaper, 2006 Intuit, Inc., pp. 1-2.
Tealeaf Press Release, "Tealeaf CX implemented by Website of the Nation's Largest Retailer", Nov. 6, 2006, Tealeaf Technology, pp. 1-2.
"Winspector—Ultimate Windows Message Spy", Mar. 6, 2008.
U.S. Appl. No. 10/751,194, filed Dec. 31, 2003.
U.S. Appl. No. 11/565,367, filed Nov. 30, 2006.
U.S. Appl. No. 11/669,525, filed Jan. 31, 2007.

* cited by examiner

The user interaction history at the critical point may be collected.
401

The user interaction history may be analyzed according to one or more rulesets.
403

An indicator may be associated with the user interaction history based on the analysis of the user interaction history.
405

*FIG. 4*

| Menu 1 Menu 2 Menu 3 Menu 4 | Menu bar 652 |
| □ △ ⌂ ◇ ☆ | Tool bar 654 |
| Tab 1 \ Forms \ Tab 3 \ Tab 4 \ | Tab bar 656 |

MODULES

Module 1
Module 2
...

Current healthcare document 620 (Form 1)

FORMS

Form 1
Form 2
Form 3
Form 4
...

Full Name................................................................... [Field 622A]

Address...................................................................... [Field 622B]

Phone Number........................................................... [Field 622C]

Email.................................................................. [Field 622D]

Primary Physician....................................................... [Field 622E]

Primary Health Plan Provider.................................... [Field 622F]

Secondary Provider........................................... [Field 622G]

Interface 650

*FIG. 6*

SYSTEM AND METHOD FOR USER SUPPORT BASED ON USER INTERACTION HISTORIES

BACKGROUND

A wide variety of software applications are currently available to assist customers with various tasks. For example, word processing applications, spreadsheets, gaming applications, tax preparation software, online applications, etc. may be used by customers for various purposes. These and other software applications may include the collection of data or other input from customers, forms or documents that customers may need to fill out, and/or sequences of steps that customers may need to follow.

The customers of these applications may encounter various difficulties with the applications. For example, customers may have difficulty logging into the applications, interacting with the user interfaces presented by applications, loading data into the applications, etc. Customers may especially encounter difficulties when interacting with an application for the first time (or after a significant absence). In some cases, the difficulties for the customer may be such that the customer may actually abandon the application. Conventionally, at least some vendors of software applications have collected "after the fact" data from the customers of their products in the form of customer calls, chats, feedback, etc. that may provide some information about where in the applications the customers encountered difficulties. However, revisions to the product and/or the publication of additional instructions to remedy past problems may be too late for customers who have already abandoned the program.

SUMMARY

In various embodiments, user support in computer software applications (e.g., healthcare management applications) may be provided (e.g., in real time) on the basis of user interaction histories (which may include one or more user interactions and/or corresponding system responses) and/or indicators corresponding to the user interactions and/or system responses. In some embodiments, the user interactions and indicators may be stored (e.g., by a storage system) at critical points in an application and analyzed (e.g., in real time) to determine if the system should intervene to assist (or, for example, reward a system user). Critical points may be defined throughout the applications by technical support personnel (or other entities). The user interaction histories (and/or indicators) at these critical points may be stored and indexed for retrieval (e.g., retrieval by support personnel attempting to assist the system user currently experiencing one or more problems with the application). In some embodiments, a storage system may store the user interaction histories and indicators and may provide the application with the corresponding index. The indicators may include positive or negative indicators respective to the user interaction history (e.g., respective to specific events in the user interaction history). The application (or another system) may include rules for analyzing the indicator(s) to determine, for example, if the system (or another entity) should intervene. For example, a series of negative indicators may indicate to the application that intervention is needed.

In some embodiments, when providing user support, an entity (e.g., technical support personnel or a support system) may access the user interaction history (e.g., using the index) in real time. The user interaction history may assist the entity in determining how to assist the system user at their current point in the application. In some embodiments, intervention methods may range from passive mechanisms (e.g., displaying additional help for a problem area) to mechanisms that may require some initiation of action on the system user's part (e.g., providing the system user with a phone number to call or web site to visit for additional support). In some embodiments, proactive actions may be initiated by technical support personnel, such as a phone call, email, or instant message initiated from the personnel to the system user. In some embodiments, user support may be not limited to assisting the system user with a problem. For example, user support may include presenting a promotion or advertisement to the system user based on the user interaction history.

In some embodiments, the system may compare an indicator for a user interaction history to one or more thresholds to determine whether to intervene. For example, if the indicator for a set of user interactions is below a lower threshold, the system may intervene to assist the system user. If the indicator for a set of user interactions is above an upper limit, the system may intervene with an advertisement or promotion. In some embodiments, the system may provide an advertisement or promotion if the indicator is below the lower threshold (e.g., to provide encouragement to the system user who may be encountering difficulties). Other methods of determining whether to offer assistance and/or promotions/advertisements are also contemplated.

BRIEF DESCRIPTION OF THE DRAWINGS

FIG. 4 illustrates a flowchart of a method for analyzing the system user's interaction at a designated critical point, according to an embodiment.

FIG. 6 illustrates an interface for the healthcare management application, according to an embodiment.

Figure 1A:
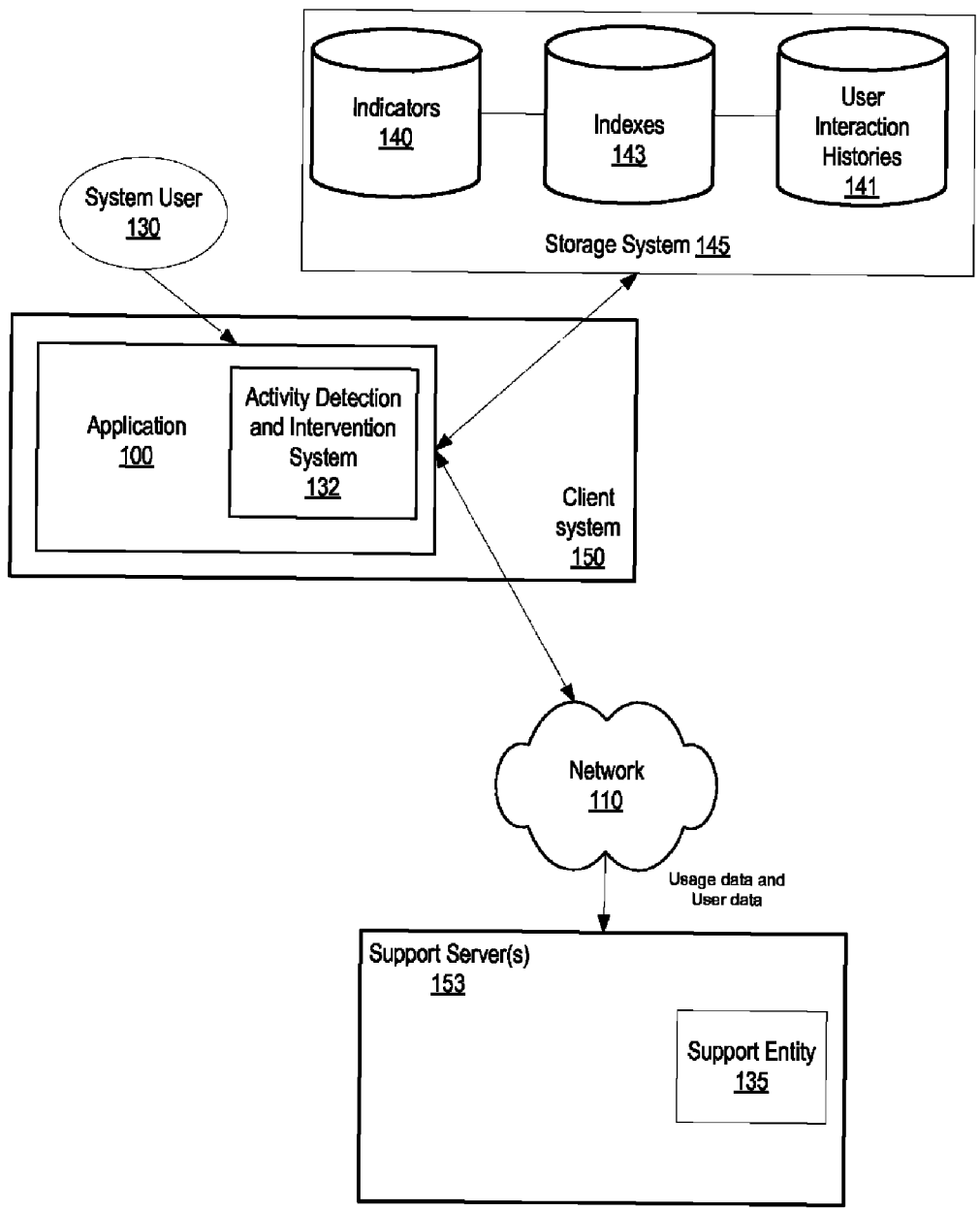
FIGS. 1*a-d* illustrate an activity detection and intervention system, according to various embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

FIGS. 1a-d illustrate embodiments of an activity detection and intervention system 132. The activity detection and intervention system 132 may be embedded in a user application 100 (e.g., see FIG. 1a) or may be a separate component (e.g., running on the local client system 150 (e.g., see FIG. 1b) or on a remote support server 153 (e.g., see FIGS. 1c-d)). At critical points in the application 100 (e.g., as defined by support personnel), the activity detection and intervention system 132 may send a user interaction history 141 (which may include one or more user interactions and/or system responses) and a corresponding indicator 140 to a storage system 145 in real time. As used herein "real time" means simultaneously or substantially in real time (for example, the user interaction history 141 and corresponding indicator 140 may be sent to the storage system 145 during the system user's use of the application). The indicator 140 may indicate that the system user 130 had a positive or negative experience at the critical point. For example, if an initial login page is identified as a critical point, upon a successful sign in, the activity detection and intervention system 132 may send a user interaction history 141 (e.g., "Successful login") and an indicator 140 (e.g., "+10") to the storage system 145. The storage system 145 may be connected to the local client system 150 or may be connected to the remote support server 153. The storage system 145 may receive the user interaction histories 141 and indicators 140 and may return an index 143 to the activity detection and intervention system 132 for each received user interaction history 141 and indicator 140. The activity detection and intervention system 132 may apply one or more rules to the indicator 140 (or to a stream of indicators 140) in real time to determine whether to intervene with the system user 130. For example, a stream of positive indicators 140 may indicate that a promotion or advertisement may be presented to the system user 130. A stream of negative indicators 140 may indicate that the system user 130 needs assistance. The activity detection and intervention system 132 may (in real time) initiate communication with support personnel. The communication may include the index(es) 143 for the relevant user interaction histories 141/indicators 140. The support personnel may then provide the index(es) 143 to the support system 145 to retrieve the relevant user interaction histories 141 and indicators 140 in order to better assist the system user 130. For example, because the support personnel receives the user interaction histories 141 from the storage system 145, the system user 130 may not need to relay his previous actions to the support personnel.

In some embodiments, user interaction histories 141 may include one or more indications of system user actions and/or system responses (e.g., a list of steps, codes, etc. showing user interactions and corresponding system responses). In some embodiments, user interaction histories 141 may include only user interactions or only system responses. User interaction histories 141 may range from a simple detailed action indicator (e.g., "F key typed") to a general action indicator (e.g., "Successful login" or "Password failed"). User interaction histories 141 may also include a collection of user actions. For example, a user interaction history 141 may include "Password failed 3x, Unsuccessful login", etc. In some embodiments, user interaction histories 141 around critical points may be sent to the storage system 145.

Critical points may be pre-defined, for example, by support personnel. The application 100 may be programmed with respective critical points for which a user interaction history 141 and indicator 140 needs to be stored. Critical points may include, for example, points in the application 100 where the user's interaction may indicate the system user 130 is encountering difficulties or has successfully completed a portion of the application 100. For example, critical points may include user attempts to enroll in the application 100, to log into the application 100, user interactions with user interfaces presented by the application 100, user attempts to load data into the application 100, user attempts to print information, etc. Critical points may be defined at specific locations in an application 100 (e.g., at a login screen) or may be defined as a specific action taken by the user or application (e.g., receiving an error message anywhere in the application may be defined as a critical point). In some embodiments, substantially all user interactions with the application 100 may be evaluated as critical points.

In some embodiments, user interaction histories 141 and indicators 140 associated with these critical points may be stored (e.g., in a storage system 145) and indexed (e.g., the user interaction history may be assigned a unique index 143). The user interaction histories 141 and indicators 140 may be stored in real time. Indexes 143 may be provided to the application 100 and/or other entities (e.g., technical support personnel) for later retrieval of the user interaction histories 141 and scores 140 as needed. In some embodiments, the activity detection and intervention system 132 may score (e.g., may provide a positive or negative indicator 140) to the user interaction histories 141. The indicator 140 may be assigned by the activity detection and intervention system 132 to users actions (or system responses) at a critical point. The indicator 140 may be assigned on the basis of pre-programmed rules (e.g., "Unsuccessful login"=−10) or may be assigned based on comparisons of the users actions with the actions of other users (e.g., comparing the current user's actions with previous successful user's actions as explained further below).

In some embodiments, the activity detection and intervention system 132 may also apply one or more rules (e.g., in real time) to the indicator 140 (or a stream of indicators 140) to determine whether to intervene. In some embodiments, the user interaction history 141 may be scored before it is stored and then may be stored only if, for example, the indicator 140 exceeds a threshold. In some embodiments, the indicator 140 may also be stored with the user interaction history 141. In some embodiments, both the indicator 140 and the user interaction history 141 may be used to provide support to the system user (e.g., system user 130A, 130B, or 130C (referred generically herein as system user 130)).

In some embodiments, scoring the user interaction histories 141 may include detecting deviations (from normal user interactions) that may indicate the system user 130 is having difficulty with the application 100. Deviations may be detected by comparing the user interaction history 141 to normal user interactions for the associated critical point. Deviations may also be detected by applying a set of rules to the user interaction history 141. The resulting indicators 140 may be compared to one or more thresholds to determine if the user interaction history 141 indicates that intervention is recommended. The activity detection and intervention system 132 may then provide or initiate one or more methods of intervention to provide context-specific help or otherwise assist system users 130 when the deviations are detected. The intervention methods may range from passive mechanisms (e.g., displaying additional help for a problem area) to mechanisms that may require some initiation of action on the system user's part (e.g., providing the system user 130 with a phone number to call or web site to visit for additional support). In some embodiments, proactive actions may be initiated by technical support personnel, such as a phone call, email, or instant message to the system user 130.

In some embodiments, the intervention methods may include a support entity 135 (e.g., technical support personnel or a support system) contacting the system user 130 (or the system user 130 contacting the support entity 135). The index 143 provided to the application 100 (and/or the support entity 135) may be used by the support entity 135 to access the relevant stored user interaction history 141. This may help the support entity 135 determine where the system user 130 first had a problem and may assist in the development of a solution for the system user 130.

In some embodiments, the intervention methods may include rewarding the system user 130 (e.g., with special coupons) or presenting the system user 130 with promotions/advertisements (e.g., related to information entered by the system user 130 into the application 100). For example, if the indicator 140 shows the system user is having a positive experience with the application 100, the system may display an advertisement to the system user. In some embodiments, depending on the indicator 140, the system may refrain from presenting an advertisement (e.g., to prevent discouraging the system user during a time when the system user is experiencing difficulties). In some embodiments, promotions (and/or advertisements) may be presented to a system user encountering difficulties (e.g., a discount on their subscription fees) in order to provide encouragement.

Figure 1B:
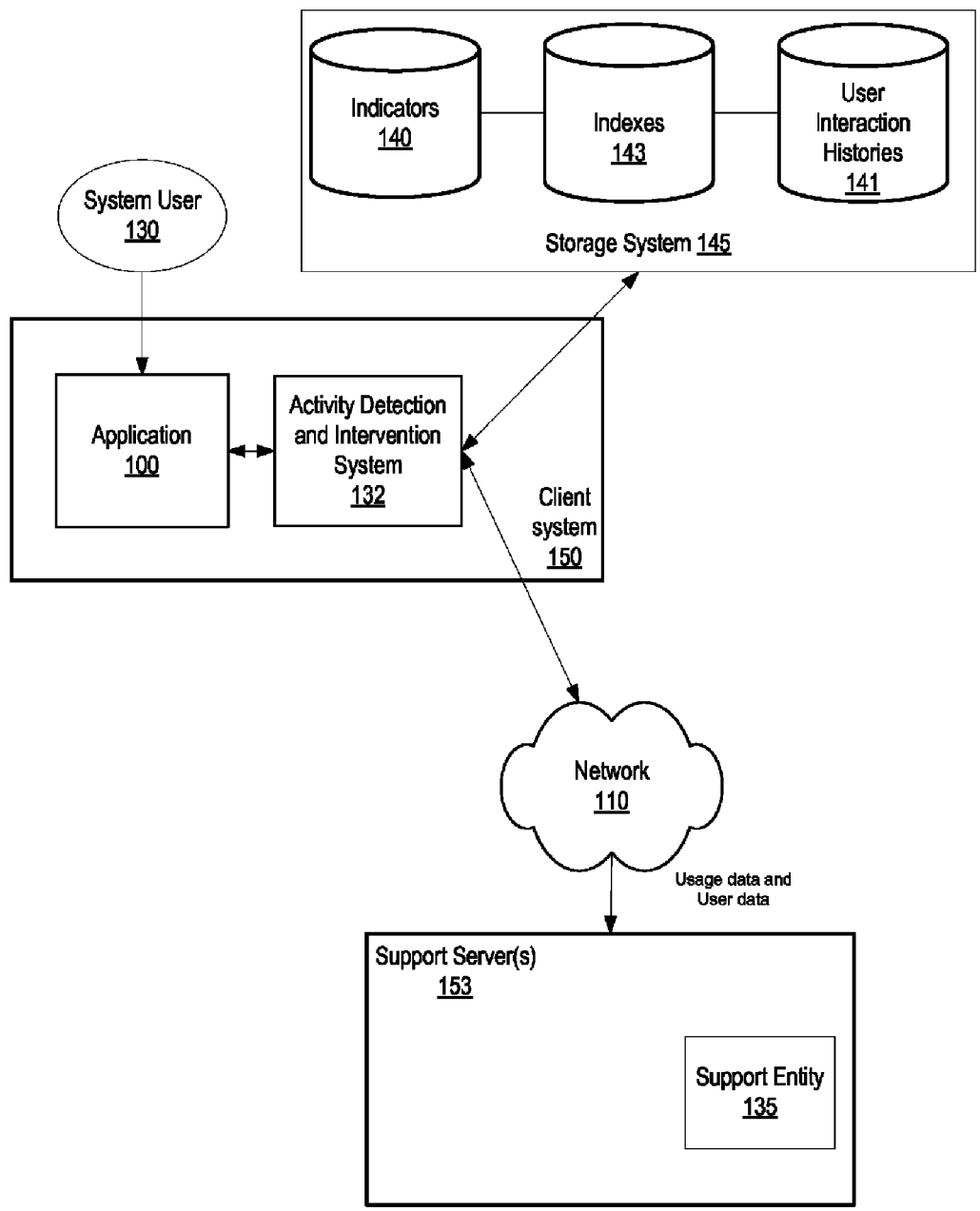
Figure 1C:
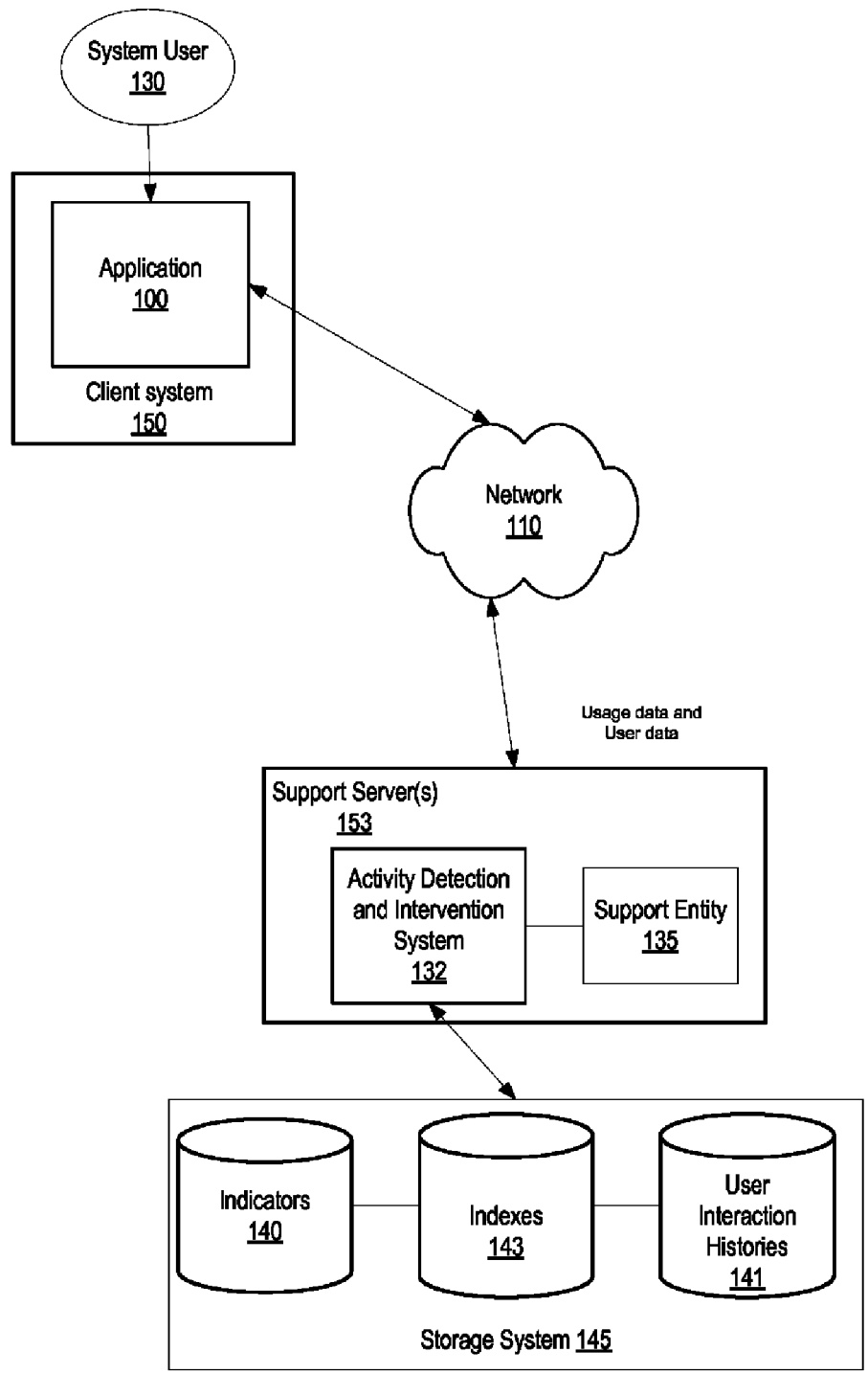
Figure 1D:
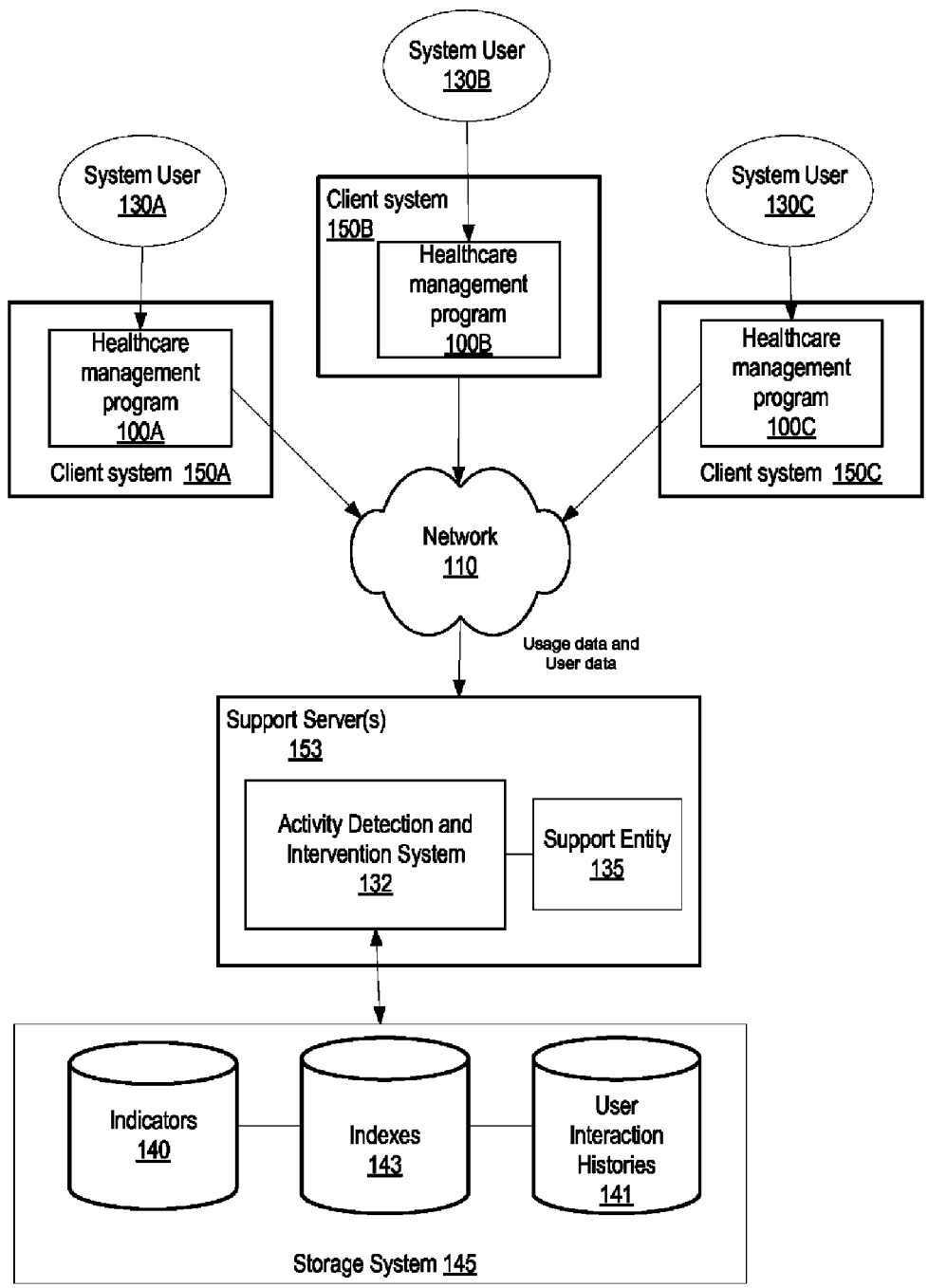

In some embodiments, determining user interaction histories and indicators may be performed by an activity detection and intervention system 132 that is integrated in the application 100 as seen in FIG. 1a. The activity detection and intervention system 132 may include code integrated with the application code for performing the collection of user interaction histories, assigning indicators, and/or determining whether to intervene. The activity detection and intervention system 132 may further store the user interaction history 141 and indicator 140 on a local storage system 145 or may send them over a network 110 to be stored on a remote storage system 145. In some embodiments, the activity detection and intervention system 132 may be a separate monitoring component on the client system 150 (as seen in FIG. 1b). In this embodiment, the activity detection and intervention system 132 may, for example, intercept messages to/from the application 100 and the operating system of the client system 150 to determine the user interaction history 141. In this embodiment, the activity detection and intervention system 132 may be a separate component that is not integrated with the application. In some embodiments, the activity detection and intervention system 132 may be a separate component running on a remote server (e.g., support server 153) as seen in FIG. 1c. In some embodiments, the application 100 may also be running on a remote server. In some embodiments, the functionality of the activity detection and intervention system 132 and/or support system 145 may be further distributed between the client system 150, support server 153, and/or a third server(s).

Figure 2A:
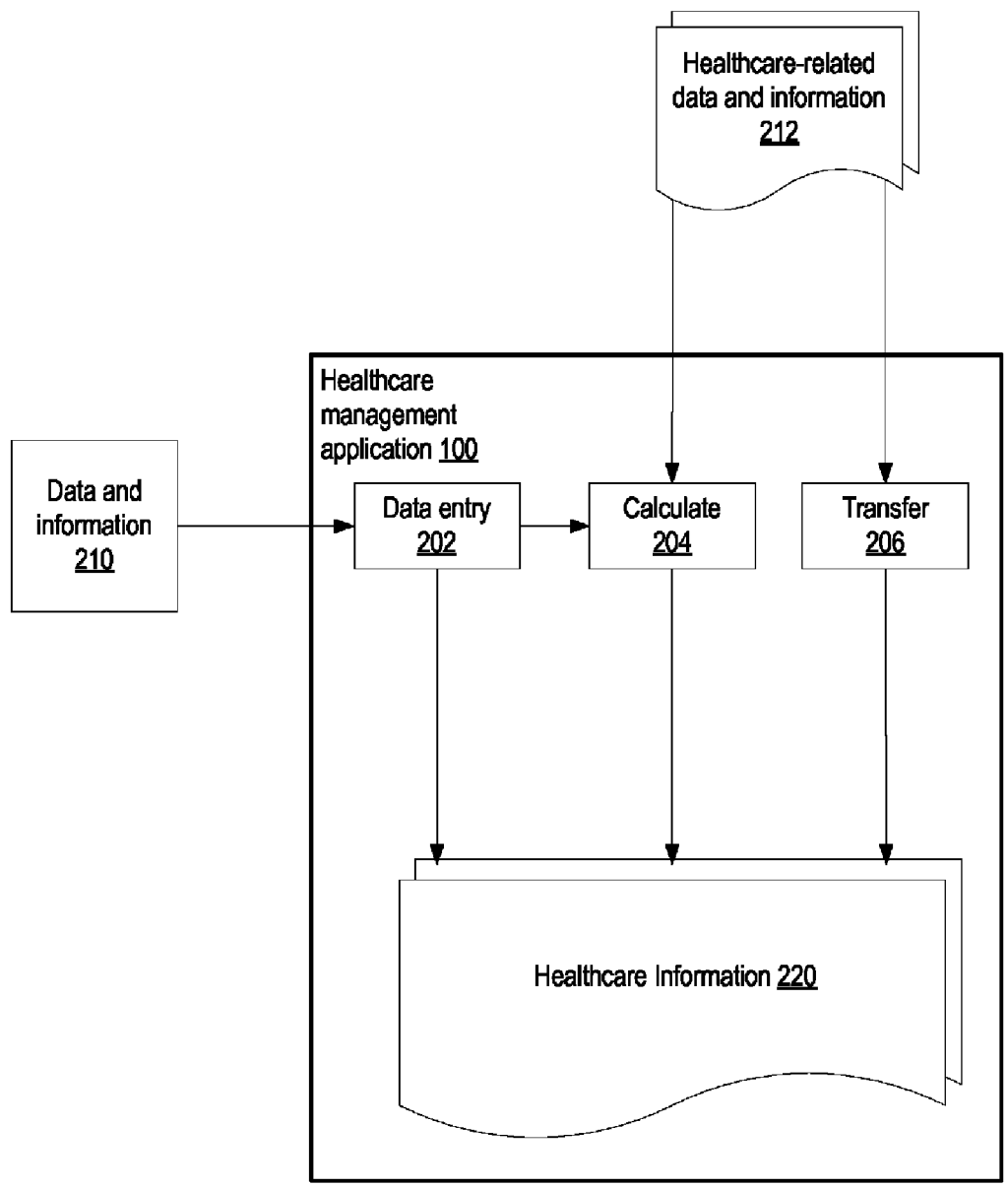
FIGS. 2*a-b* illustrates a healthcare management application, according to an embodiment.
Figure 2B:
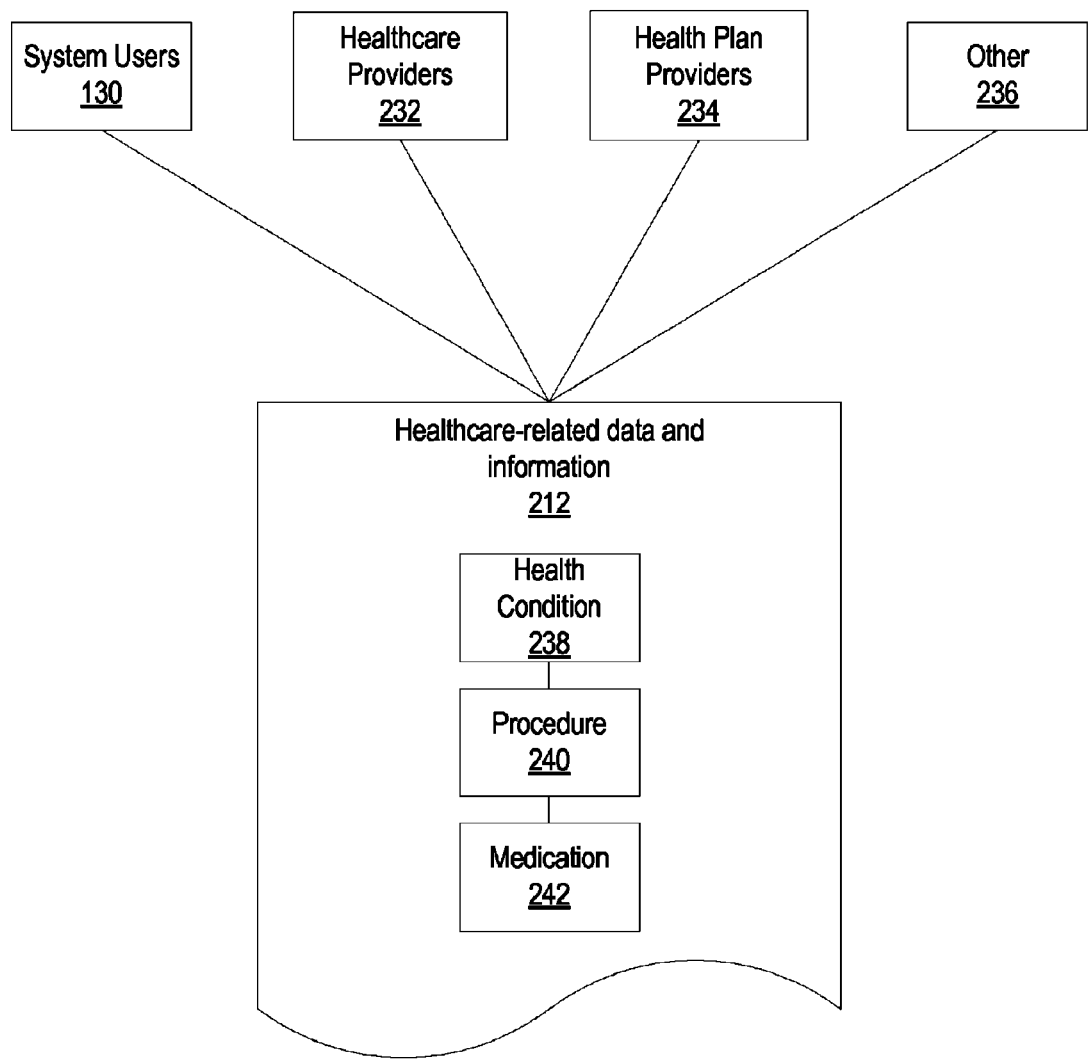

FIGS. 2a-b illustrates a healthcare management application 100A, according to an embodiment. In some embodiments, the activity detection and intervention system 132 may be used for software programs such as the healthcare management application 100A. In some embodiments, the activity detection and intervention system 132 may enable support entities for the healthcare management application 100A to detect signs indicating that the system user 130 is having difficulties in the current healthcare management application 100A, and may provide intervention mechanisms that proactively address the system users' problems as they arise.

Embodiments of the activity detection and intervention system 132 may detect the system user's problems in real- or near-real-time, and may intervene to provide passive or proactive assistance to the system user 130 to allow the system user 130 to continue preparing, for example, healthcare documents and healthcare information 220 using the healthcare management application 100A. In addition, storing the user interaction history 141 with the system may increase the speed and success of technical support in assisting the system user 130 to correct any problems the system user 130 may experience.

In some embodiments, the healthcare management application 100A may provide the system user 130 with a framework and tools for collecting, organizing, and managing healthcare-related data and information 212 such as data related to their health history (e.g., health conditions 238, procedures 240, medications 242, etc.); past, current and future health services; health insurance plan(s) (e.g., what services are covered, coverage limits, claims status, and explanations of benefits); and finances related to healthcare (e.g., health insurance premiums, deductibles, co-payments, benefit payments, reimbursements from Flexible Spending Accounts (FSAs), Health Reimbursement Accounts (HRAs), or health savings accounts, maximum out-of-pocket expenses, and maximum lifetime benefits.) For example, the healthcare management application 100A may be configured to provide the system user 130 with a comprehensive and detailed health history, or may allow the system user 130 to extract and/or analyze his or her data regarding a particular health condition or event (e.g., an injury or illness) or a particular healthcare-related service (e.g., a particular diagnostic exam or a course of treatment for a chronic condition.) In some embodiments, health-related data and information may be provided by system users 130, healthcare providers 232, health plan providers 234, or other entities 236.

In some embodiments, the healthcare management application 100A (and/or the activity detection and intervention system 132) may be implemented as a web-based service to which system users 130 and/or employers may subscribe. In some embodiments, it may be implemented as a stand-alone application, such as one installed and executed on a desktop computer by the system user 130. In some embodiments, the healthcare management application 100A may include both a locally installed application (e.g., a client portion 150A, 150B, or 150C) and a remote, web-based application (e.g., a server portion 153). For example, in some embodiments, the system user 130 may enter healthcare-related data and information 112 on a locally installed client application (e.g., local healthcare management application 100AA, 100B or 100C referred to generically herein as healthcare management application 100A) and then may upload the information (e.g., over network 110) to a healthcare management service server for secure storage and/or further analysis.

As seen in FIG. 2b, in various embodiments, the healthcare management application 100A may receive information from one or more of: the system user 130, one or more healthcare providers 232, one or more health plan providers 234 (e.g., from health plan administrators such as health insurance representatives), and other sources 236 (e.g., one or more financial institutions). In some embodiments, the information received and/or managed by the healthcare management application 100A (e.g., healthcare-related data and information 212 and other data and information 210) may be formatted according to a standard data exchange format.

In some embodiments, the healthcare management application 100A may maintain healthcare information 220 in one or more databases (or in other suitable formats) in a local or remote memory, or in a combination of the two. For example, a database located on a healthcare management service server may be configured to securely store healthcare information 220 for multiple individual system users 130 or for employees of one or more corporations subscribing to the healthcare management service, while a database stored locally on the system user's computing system may include only his or her own personal healthcare-related data.

FIG. 2a illustrates the preparation of healthcare information 220 using the healthcare management application 100A according to an embodiment. Healthcare management application 100A may be configured to guide the system user 130 through the healthcare management application 100A step-by-step, and may automatically perform necessary healthcare management in accordance with data input, forms, tables, and formulas stored with or coded into the program.

Figure 8:
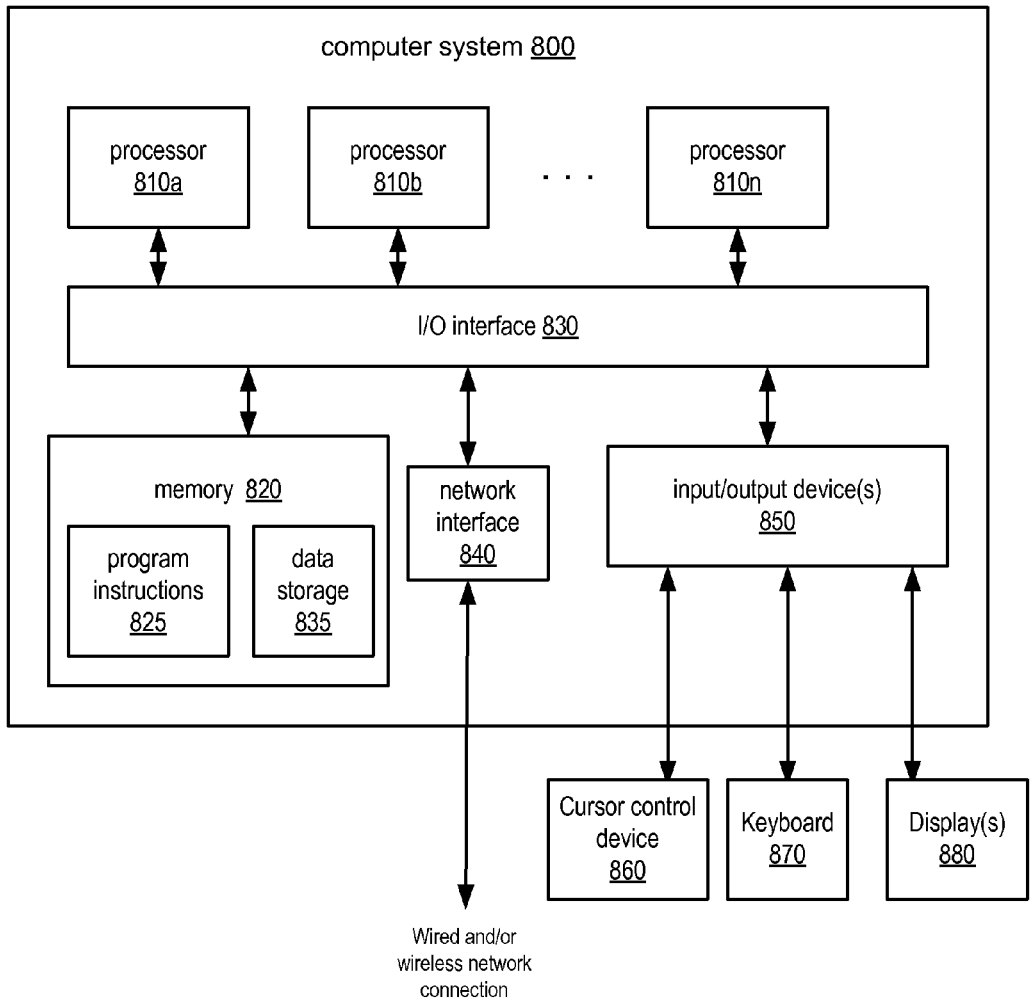
FIG. 8 illustrates an exemplary computer system on which embodiments may be implemented.

An instance of healthcare management application 100A may be installed and executed on a computer system. The computer system may be a personal computer (PC) such as a desktop computer, laptop, notebook computer, mobile phone, TV set-top boxes, personal digital assistant (PDA), or other computing device. An exemplary computer system on which an instance of healthcare management application 100A may be implemented is illustrated in FIG. 8. Alternatively, healthcare management application 100A may be a network- or web-based healthcare information 220 program which the system user 130 may access (e.g., via a web browser or other application on the system user's local computer system) to prepare various healthcare information 220 forms via a network connection to a remote computer system (e.g., a server), without necessarily installing the healthcare management application 100A on the local computer system.

The system user 130 may access or execute healthcare management application 100A to manage healthcare information 220 for the system user 130. Note that the healthcare entity may be a person (e.g., a doctor), a business (e.g., a hospital), or other entity for which healthcare information 220 is to be prepared and/or stored. Further, the healthcare information 220 may be maintained for two or more system users 130 (e.g., a family). The healthcare information 220 may be current healthcare information 220 being accessed for monitoring healthcare billing, insurance payments/deductibles, etc.

Healthcare management application 100A may provide a user interface to guide or step the system user 130 in the preparation and storage of healthcare information 220. Different areas for preparing healthcare information 220 for different healthcare facilities may be identified as different modules in the healthcare management application 100A. Healthcare information 220 may be associated with a particular module (e.g., recently received medical bills, insurance payouts, insurance premiums, etc.) in the healthcare management application 100A. Thus, healthcare management application 100A may provide a user interface that allows the system user 130 to select an appropriate module from among two or more modules for preparing healthcare information 220 (e.g., to prepare documents for filing with a particular healthcare entity).

Healthcare management applications 100 may assist with various healthcare documents, for example, various forms, bills, insurance reports, etc. included in the stored healthcare information 220. In some implementations, these healthcare documents may be graphically presented by the healthcare management application 100A to the system user 130 on a display device (e.g., a computer monitor or screen of a handheld device such as a PDA). The healthcare management application 100A may provide a data entry mechanism 202 via a user interface with various user interface elements (menus, dialog boxes, etc.) and user-selectable interface items (menu items, buttons, controls, text entry boxes, etc.) whereby the system user 130 may access the documents as needed and enter or modify data on the various healthcare documents using one or more data entry/cursor control mechanisms, such as a keyboard and mouse. These documents may be presented on the system user interface as templates that, when partially or completely filled out, may be "saved" for the particular healthcare entity for which the documents are prepared.

In addition, information from previous and/or related healthcare information 220 and/or from other sources or documents may be transferred 206 into or used in the calculation 204 of values for fields of the electronic healthcare documents. Further, values from a field or fields on one or more electronic healthcare documents may be transferred 206 to other electronic healthcare documents. For example, a calculated value from a bill may be transferred into or used in the calculation of a field (e.g., a required payment) on another electronic healthcare document.

Instead of or as an alternative to entering the necessary data and information directly to the electronic healthcare documents, some implementations of the healthcare management application 100A may provide an input mechanism whereby the system user 130 inputs necessary data and information into input fields on data entry displays presented to the system user 130 by healthcare management application 100A as electronic healthcare documents. Note that data and/or information from other sources, which may include data and/or information from prior healthcare information, from other data entry displays, or from other electronic healthcare documents related to the preparation of the healthcare information under preparation, may be transferred into or used in the calculation of values for some fields in the data entry displays. Data and information from the data entry displays may then be automatically transferred into the appropriate locations on electronic healthcare information documents and/or onto other data entry displays. The healthcare management application 100A may perform any necessary calculations using the data and information from the data entry displays, and possibly data and information from other sources such as prior healthcare information, to generate appropriate calculated values for certain fields of the healthcare information documents.

In addition to user-entered or transferred values, healthcare management application 100A may perform various calculations 204 to generate values for some fields in electronic healthcare documents. Note that inputs to a particular calculation to generate a value for a field may include one or more values from one or more sources. One or more data values entered by the system user 130 via the data entry user interface 102 may be used in calculations to generate new values from some fields in electronic healthcare documents. In some cases, one or more values from prior healthcare information may be used in calculations to generate new values for some fields. Calculated values or values from fields on electronic healthcare documents may be used as input into other calculations. Also note that some values used in calculations may be coded as "constants" into the healthcare management application 100A, or alternatively may be read into the healthcare management application 100A from a stored data file as needed.

The system user 130 may enter necessary data and information via the system user interface of the healthcare management application 100A, and, when done, access the system user interface to direct the healthcare management application 100A to complete the healthcare information 220 under preparation. The healthcare management application 100A may perform any necessary calculations using the entered data and information and in accordance with healthcare information 220 formulas relevant to the particular healthcare information 220 under preparation, and possibly data and information from other sources such as from prior healthcare information or other healthcare-related documents, to generate appropriate calculated values for certain fields of the healthcare information 220 under preparation.

The healthcare information 220 may indicate that the system user 130 owes a healthcare entity or that the system user 130 is owed a refund from the healthcare entity (or insurance company). The payment or refund request may then be filed with the healthcare entity and/or insurance company. For example, the payment or refund request may be electronically transmitted to the healthcare entity. Alternatively, the payment or refund request may be printed and mailed or otherwise delivered to the healthcare entity. If money is due, the amount may be paid to the healthcare entity by the system user 130 in installments. The payment(s) may be transferred electronically from an account (e.g., a bank account or credit card account) of the system user 130 (i.e., and electronic funds transfer (EFT)) or alternatively may be paid by check. If a refund is due, the refund amount may be paid to the system user 130 by the healthcare entity or insurance company either electronically to an account (e.g., a bank account) of the system user 130 or by check.

While embodiments of the activity detection and intervention system 132 are generally described herein in reference to healthcare management applications 100, embodiments of the activity detection and intervention system 132 may be implemented for other types of computer-implemented processes, programs, and applications (which may be collectively identified as computer applications), including financial software programs (e.g., tax preparation programs, payroll programs, etc.) and human resource applications. Thus, healthcare management applications 100 are used as an example herein, and it is to be understood that the figures and discussions using healthcare management applications 100 as examples are intended to apply to other types of software programs, including financial software programs.

Figure 3:
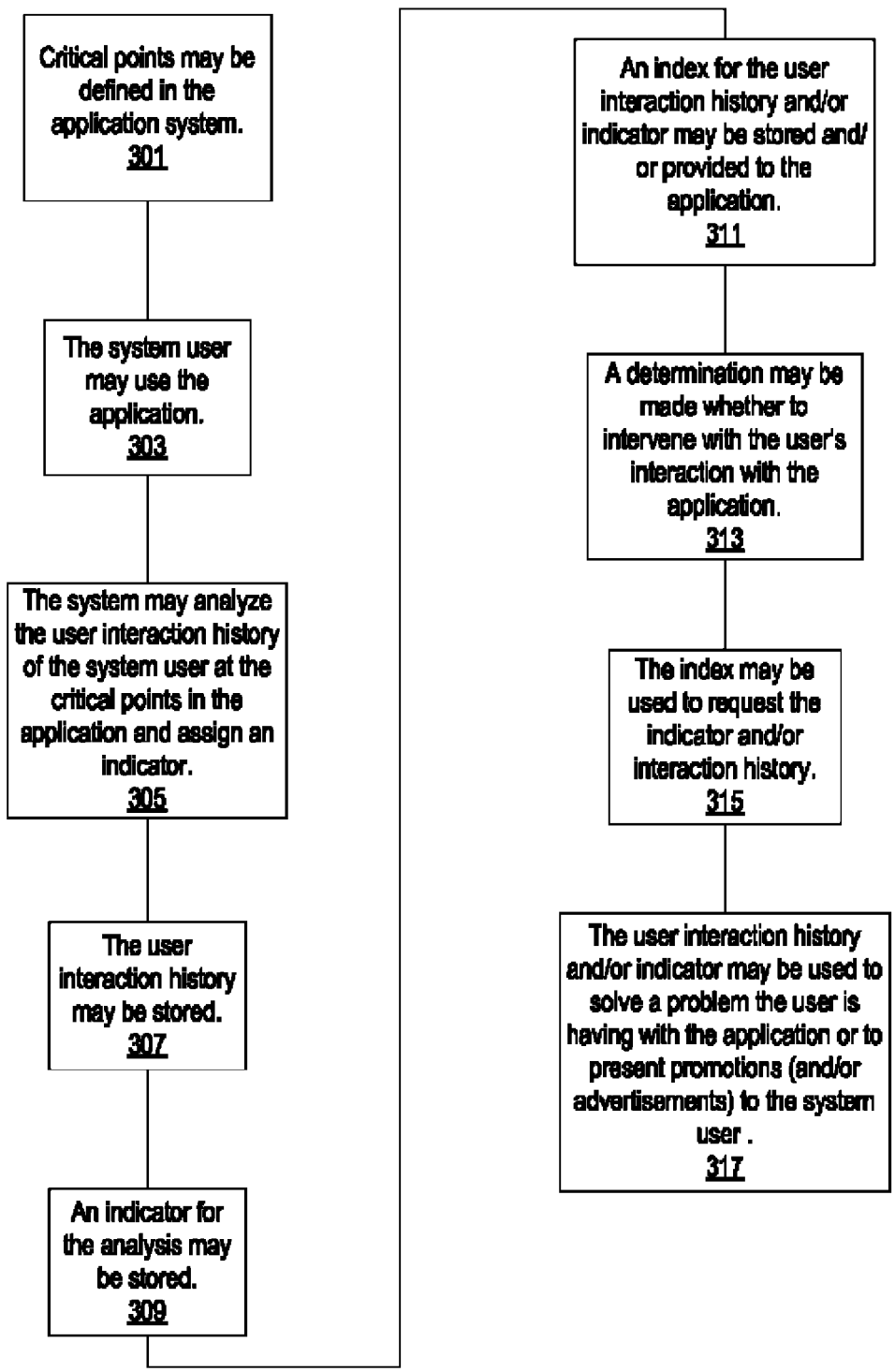
FIG. 3 illustrates a flowchart for activity detection and intervention, according to an embodiment.

FIG. 3 illustrates a flowchart for activity detection and intervention, according to an embodiment. It should be noted that in various embodiments of the methods described below, one or more of the elements described may be performed concurrently, in a different order than shown, or may be omitted entirely. Other additional elements may also be performed as desired.

At 301, critical points may be defined in the application 100. In some embodiments, the critical points may be defined by, for example, a programmer, technical support personnel, or a support system. The critical points may be defined as points in the application 100 where the user's interaction may indicate the system user 130 is encountering difficulties or has successfully completed a portion of the application 100. The critical points may include critical points in which a negative user experience may result in the system user 130 abandoning the application 100. For example, the system user's interaction with a "User login" page may be defined as a critical point because a negative user experience at this early stage may result in the system user 130 abandoning the application 100. A negative experience at the "User login" page may include three or more failed attempts to login.

As another example, the system user's interaction in adding details for their health plan to their healthcare information 112 managed by the healthcare management application 100A may be defined as a critical point. Other critical point types are also contemplated. In some embodiments, user critical points that present opportunities to present a promotion to the system user 130 may also be defined as critical points. For example, a user interaction indicating the system user 130 is interested in additional services (e.g., if the system user 130 accesses a part of the application that requires an upgraded subscription). In some embodiments, the critical points may be defined at points where a user's success marks a completion point in the application. In some embodiments, substantially all user interactions may be treated as critical points.

At 303, the system user 130 may use the application 100. For example, the system user 130 may interact with the healthcare management application 100A. In some embodiments, the system user 130 may be interacting with another type of application (e.g., a financial application). In some embodiments, the application 100 may be a network or web-based application 100. In some embodiments, the application 100 may be a stand-alone program installed and executed on a local client system.

At 305, the activity detection and intervention system 132 may analyze the user interaction history 141 of the system user 130 at a critical point in the application 100 and may assign a corresponding indicator 140. The user interaction histories 141 may include a one or more system user actions in the application 100. For example, the user interaction history 141 at a critical point may include "Successful login", "Successful download", "Unsuccessful report completion", etc. In some embodiments, the user interaction history 141 may include one user interaction, a string of user interactions, or a summary of user interactions. The user interaction history 141 may also include more detail. For example, the user interaction history 141 may include the system user's interactions with the application's user interface. The user interaction history 141 may include one or more of keystrokes, user interface item or element selections (e.g., the selection of screens, buttons, text or numeric fields, menus, menu items, tabs, and so on, but not necessarily made using a cursor control device), cursor location information (e.g., information indicating that the cursor is hovering over a particular user interface element), timing information (e.g., the time the system user 130 spends on a particular field of a displayed screen), etc. The user interaction history 141 may indicate one or more of repetitive actions (e.g., going back and forth between two screens or two items on one screen), frequency of clicking, the time it takes the system users 130 to perform certain actions (e.g., how long the system users 130 tend to spend on a particular screen), the sequences that the system users 130 follow to perform particular tasks (including subtasks such as preparing a particular document or field in a document and the overall task of preparing healthcare information 220), etc. For example, the system may record that the system user 130 had three failed attempts to enter their password on login. As another example, the system may record an unsuccessful attempt by the system user 130 to set-up a new employee in a payroll system. Another example may include an attempt to download information to their system. Other examples are also contemplated.

In some embodiments, the system may determine whether the user interaction history 141 at the critical point indicates a positive or negative experience. For example, if the critical point is the "User login" page and the user interaction history 141 indicates the system user 130 selected "Submit" and then received an error message, the user interaction history 141 may be regarded as negative. If the user interaction history 141 indicates the system user 130 selected "Submit" and then the system user 130 achieving a successful login for the first time, the user interaction history 141 may be regarded as positive. Other negative and positive events are also contemplated. For example, successfully receiving and installing a download and/or receiving a requested report may be indicated as positive events. A failed download or an error message indicating additional information is needed before the report can be provided may be indicated as negative events. The analysis may include scoring the user interaction history 141. In some embodiments, an indicator 140 may be assigned to the user interaction history 141 as a result of the scoring. In some embodiments, the indicator 140 may be a numerical indicator 140 that may reflect a degree of positive or negative interaction (e.g., the larger the positive number, the more positive the user interaction and vice-versa). The analysis may also result in non-numerical or mixed indicators 140. In some embodiments, the system may not analyze the user interaction history 141.

At 307, the user interaction history 141 may be stored (e.g., on storage system 145). In some embodiments, the user interaction history 141 may include a history of one or more details of user interactions with the application 100. For example, the user interaction history 141 may include information about the system user selecting the "Submit" button (and, in some embodiments, the other user and system actions surrounding the system user selection) may be stored. In some embodiments, the activity detection and intervention system 132 may store the user interaction history 141 with the indicator 140. In some embodiments, the user interaction history 141 may be stored on another system.

At 309, an indicator 140 of the analysis may be stored (e.g., on storage system 145). In some embodiments, the activity detection and intervention system 132 may store the indicator 140 (e.g., "positive", "negative", numerical indicator 140, etc.) on a storage system 145 on the same system as the application 100. In some embodiments, the indicator 140 may be stored on the storage system 145 on a remote system (e.g., a system accessible over a network). In some embodiments, the indicator 140 and/or user interaction history 141 may only be stored if the indicator 140, for example, exceeds a threshold (or in some other way indicates the system user 130 is either encountering difficulty or has had a positive experience).

At 311, an index 143 for the indicator 140 and/or user interaction history 141 may be stored and/or provided to the application 100 (e.g., to the activity detection and intervention system 132). In some embodiments, the index 143 may include a "ticket" number that refers to the user interaction history 141 and/or indicator 140 (e.g., through the use of a look-up table that, for example, references the index 143 to a memory location in the storage system 145 for the indicator 140 and/or user interaction history 141). In some embodiments, the index 143 may represent a session identifier (ID). Other indexes 143 are also contemplated. In some embodiments, the system may store the user interaction history 141 with and/or relative to the index 143 and may return the index 143 to the application 100.

At 313, a determination may be made (e.g., by the activity detection and intervention system 132) whether to intervene with the system user's interaction with the application 100. In some embodiments, a rulespace may be developed to determine when to intervene. For example, the rulespace may specify that if the indicator 140 is numerical and the numerical indicator 140 is above or below a threshold, the activity detection and intervention system 132 should intervene. In some embodiments, a cumulative score (e.g., of the past m numerical indicators 140) may be maintained and compared to a threshold. In some embodiments, the threshold may be predetermined. The threshold may be specific to a critical point or may be general (e.g., used for all critical points). In some embodiments, the threshold may be dynamic. For example, the threshold may be adjusted based on a running average of indicators 140 for a system user 130. The threshold may also be adjusted to adjust the sensitivity of the system. For example, if the system is indicating too many negative events (and, for example, a call center is being flooded with calls), the threshold may be adjusted to reduce the number of negative events reported. Other threshold configurations are also contemplated.

In some embodiments, the rulespace may be defined to consider time when determining whether to intervene. For example, if the system user 130 has had a series of positive events and a promotion has been presented to the system user 130, another promotion may not be presented to the system user 130 until a minimum amount of time has passed (e.g., one month). As another example, if the system user 130 is in a difficult section of an application 100 (e.g., attempting to set-up a new employee in a payroll application 100) the system 132 may respond quicker with offers to intervene. Other rulespaces are also contemplated. For example, another rulespace may be defined to start a pattern search if a negative score is indicated (for example, to allow the system 132 recognize negative patterns and intervene quicker if the system user 130 is experiencing a series of negative interactions). In some embodiments, the rulespace may be defined to consider the type of section of the application 100 the system user 130 is currently in (e.g., a smaller negative score may be required to offer intervention if the system user 130 is in a technically difficult section of the application 100). In some embodiments, the rulespace may be defined to consider the difficulty of a solution needed to help the system user 130 (e.g., the system 132 may be quicker to offer intervention if it appears the system 132 can offer a quick solution).

In some embodiments, the activity detection and intervention system 132 may notify a support entity 135 (e.g., technical support personnel or a support system) as to problematic user interactions at the critical points. The notification may include the index 143. In some embodiments, the activity detection and intervention system 132 may access another system to intervene. For example, the activity detection and intervention system 132 may access a system to assist the system user automatically (e.g., using a series of troubleshooting rules). As another example, if the activity detection and intervention system 132 determines that a user promotion should be offered, the activity detection and intervention system 132 may access another system to implement notifying the system user 130 of the promotion.

At 315, the index 143 may be used to request the user interaction history 141 and/or indicator 140 (e.g., by the support entity 135 who may want to view the indicator 140 and/or user interaction history 141 to assist the system user 130 in solving a problem). In some embodiments, the index 143 (e.g., the "ticket" number, session ID, etc.) may be sent to the support entity 135 at the point the problem (or need for a promotion/advertisement) is reported to the support entity 135. The support entity 135 may then use the index 143 to request the indicator 140 and/or user interaction history 141. In some embodiments, the index 143 may be computer readable and an automated program may use the index 143 to access the indicator 140. In some embodiments, the system user 130 may be prompted with a request for permission to provide the user interaction history 141 to, for example, the support entity 135 before the user interaction history 141 is provided to the support entity 135.

At 317, the user interaction history 141 and/or indicator 140 may be used to solve a problem the user is having with the application 100 or to present promotions (and/or advertisements) to the system user 130. For example, the user interaction history 141 surrounding the critical point may assist the support entity 135 in helping the system user solve their problem by allowing the support entity 135 to determine where the system user deviated from normal behavior for the critical point. If the support entity 135 is technical support personnel, the personnel may be able to find the deviation by examining the user interaction history 141 and relying on past experience with the application 100 to find where the system user 130 deviated. In some embodiments, the support entity 135 may include a support system and the support system may use a rule set to analyze the user interaction history 141 to find the problem and develop a solution to suggest to the system user 130.

In some embodiments, the user support may include displaying contact information for the support entity 135 for the computer application 100. The contact information may include a telephone number or a web address (e.g., to a web site for the support entity 135). In some embodiments, the support entity 135 may contact the system user 130 directly. Contacting the system user 130 may include one or more of telephoning the system user 130, instant messaging the system user 130, text messaging the system user 130, and sending an electronic mail message to the system user 130.

In some embodiments, the user support may include displaying help information related to the application 100 (e.g., in a pop-up window). In some embodiments, help information may be provided relative to a specific critical point the system user 130 is on (e.g., a specific aspect of a document the system user 130 is preparing). In some embodiments, an alternative user interface may be provided (e.g., for a particular electronic healthcare form the system user 130 is preparing). In some embodiments, the system user 130 may be given the option to have the support entity 135 (e.g., a technical support personnel) automatically complete a portion of the application 100 at the critical point (e.g., complete an electronic healthcare form (or, for example, provide suggested content for the portion of the particular electronic healthcare form)).

In some embodiments, the activity detection and intervention system 132 may provide specific help content based on the user interaction history 141 and/or indicator 140. For example, the activity detection and intervention system 132 may identify a specific pattern in the user interaction history 141 that is similar to a pattern of other users interacting with the application 100 while, for example, looking for a specific form. If, after statistically comparing the patterns, the activity detection and intervention system 132 recognizes the pattern in the user interaction history 141 of a particular system user 130, the activity detection and intervention system 132 may initiate a response that uses, for example, the support system to help locate the specific form (e.g., the response may include asking the system user 130 if they are looking for the specific form). In some embodiments, the activity detection and intervention system 132 may identify other patterns from the user interaction history 141 of the system user 130 (e.g., at a critical point) and may provide responses particular to the identified patterns.

In some embodiments, the activity detection and intervention system 132 may use a support entity 135 to present a simplified version of the document or form to the system user 130. For example, the activity detection and intervention system 132 response may break up the form into separate parts, and present each part to the system user 130 on a simplified screen with possible additional information about the particular part. As another example, the activity detection and intervention system 132 response may present at least a portion of a form or document to the system user 130 in a more visual, graphical format that may be easier for the system user 130 to understand and use rather than in a standard, more text-oriented format.

In some embodiments, the user interaction history 141 and/or indicator 140 may be used to reward the system user 130 (e.g., if the system user 130 is encountering problems, the system may reward the system user 130 for not abandoning the application 100 (e.g., a free month of access)). In some embodiments, the indicator 140 and/or user interaction history 141 may be used to pick a promotion to present to the system user 130. For example, if the system user 130 is accessing a specific part of the application 100, an appropriate promotion (e.g., for additional software or services) may be presented to the system user 130. In some embodiments, the indicator 140 and/or user interaction history 141 may be used for statistical purposes or to present personnel with after-the-fact information on current problems encountered by various system users 130.

FIG. 4 illustrates a flowchart of a method for analyzing the system user's interaction at a designated critical point, according to an embodiment. It should be noted that in various embodiments of the methods described below, one or more of the elements described may be performed concurrently, in a different order than shown, or may be omitted entirely. Other additional elements may also be performed as desired.

At 401, the user interaction history 141 including user actions (and/or system responses) during a critical point may be collected. In some embodiments, the user interaction history 141 may include only a single action or system response. "Collecting" the actions may include placing the user actions (and/or system responses) into a form for storage in the storage system 145. If the application 100 is a network- or web-based application 100, the user interaction history 141 may be collected by the activity detection and intervention system 132 directly, and possibly in real-time or near-real time, from the server(s) that are accessed by the system users 130 of application 100. If the application 100 is a stand-alone program installed and executed on the client systems 150, as is illustrated in FIG. 1, the user interaction history 141 may be collected in real-time or near-real-time remotely over network 220 by activity detection and intervention system 132, or alternatively may be collected and stored locally on the client systems 150, and then uploaded to the activity detection and intervention system 132 via network 110. In some embodiments, the user interaction history 141 may be collected via peer-to-peer networking. Note that, in some embodiments, activity detection and intervention system 132 may first seek the system users' permission before uploading or otherwise obtaining the user interaction history 141 (or other data) for example as part of an initial licensing agreement accepted by system user 130 when installing the application 100 on their system.

At 403, the user interaction history may be analyzed according to one or more rulesets. In some embodiments, the rulesets may be provided by technical support personnel. Rules may be applied to user interaction histories 141 to determine if one or more deviations exist or if one or more positive interactions exist (e.g., such that a promotion or advertisement may be presented). Rulesets may be written and/or implemented in various programming languages. In some embodiments, rulesets may be used in addition to, or in place of, comparing the user interaction history 141 to other interaction histories.

In some embodiments, using rulesets may include comparing the user interaction history 141 to one or more other user interaction histories 141. For example, as a system user 130 fills in a form, the answer formats may be compared to the answer formats of other users (e.g., date formats, phone number formats, etc.). The activity detection and intervention system 132 may analyze the user interaction history 141 according to one or more statistical or other data analysis techniques. In some embodiments, user interaction histories 242 may be associated with critical points in the healthcare management application 100A, such as completing particular forms, documents, or fields presented to system users 130 by healthcare management application 100A. In some embodiments, the analysis may be used to determine user interaction histories 141 common among the system users 130 of the healthcare management application 100A, including normal user interaction histories and possibly abnormal user interaction histories. For example, a normal user interaction history may include a pattern of interactions that the system user 130 might normally follow to prepare a particular healthcare document. An abnormal user interaction history may include a pattern that indicates the system user 130 may be having difficulty in a particular area of the healthcare management application 100A. For example, the activity detection and intervention system 132 may detect a user interaction history 141 for the system user 130 on a particular screen that differs from a normal user interaction history for that particular screen. For example, the detected pattern may include alternating back and forth between items on a screen of the application 100, not completing the screen, etc.

In some embodiments, determining an indicator 140 for the current user interaction history 141 may include comparing the normal user interaction history for a particular healthcare document (e.g., the completion of which constitutes a critical point) to the system user's current user interaction history 141 to detect if a deviation from the normal user interaction history exists. For example, the activity detection and intervention system 132 may track the system user's interactions while preparing the healthcare document and may correlate those actions against the normal user interaction history for that healthcare document. This may allow the system to detect deviations from the normal user interaction history. In some embodiments, the activity detection and intervention system 132 may track the system user's interactions during preparation of the healthcare document and correlate those interactions with an abnormal user interaction history. In some embodiments, thresholds may be provided for deviations from the normal or normal user interaction histories for various aspects or areas of the healthcare management application 100A, and if system user's deviation from the normal user interaction history exceeds the threshold for the current aspect or area of healthcare management application 100A that the system user 130 is currently working on or in, then the activity detection and intervention system 132 may store the user interaction history and/or indicator (and may report them to, for example, technical support personnel). Note that each normal user interaction history may be assigned a threshold, or alternatively one threshold may be provided for all normal user interaction histories, or as another alternative different thresholds may be provided for different areas of the healthcare management application 100A that each may incorporate one or more normal user interaction histories.

In some embodiments, the activity detection and intervention system 132 (e.g., implemented on server 230) may collect user interaction histories and other data from instances of the healthcare management application 100A on client systems 200. Indicators 140 may be determined from collected user interaction histories 141 (which may be collected in real time, for example, over a network). Additional system user data may also be collected. For example, previous healthcare documents and healthcare information 220 for system users 130 may be collected, stored, and associated with the corresponding system users 130. Note, however, that in one embodiment, some information (e.g., information that may be used to identify particular healthcare facilities) may be filtered, blocked, or encrypted to protect the privacy of one or more entities and/or comply with laws concerning disclosure of sensitive information.

At 405, an indicator 140 may be associated with the user interaction history based on the analysis of the user interaction (e.g., based on the outcomes of 403 and/or 405). For example, if the user interaction history 141 indicates that a system user 130 has had three failed login attempts, an indicator "−10" may be assigned (other indicators are also contemplated). The negative value may indicate a negative experience and the "10" may be relative to other numbers used as indicators 140 (e.g., if the application 100 causes the system user's local system to crash, an indicator of "−50" may be assigned). In some embodiments, the indicator 140 may be compared to a threshold (e.g., "−5"). Numbers greater than the threshold (or, for example, less than a negative threshold) may trigger the activity detection and intervention system 132 to intervene (or indicate to a support entity 135 that intervention may be needed).

Figure 5:
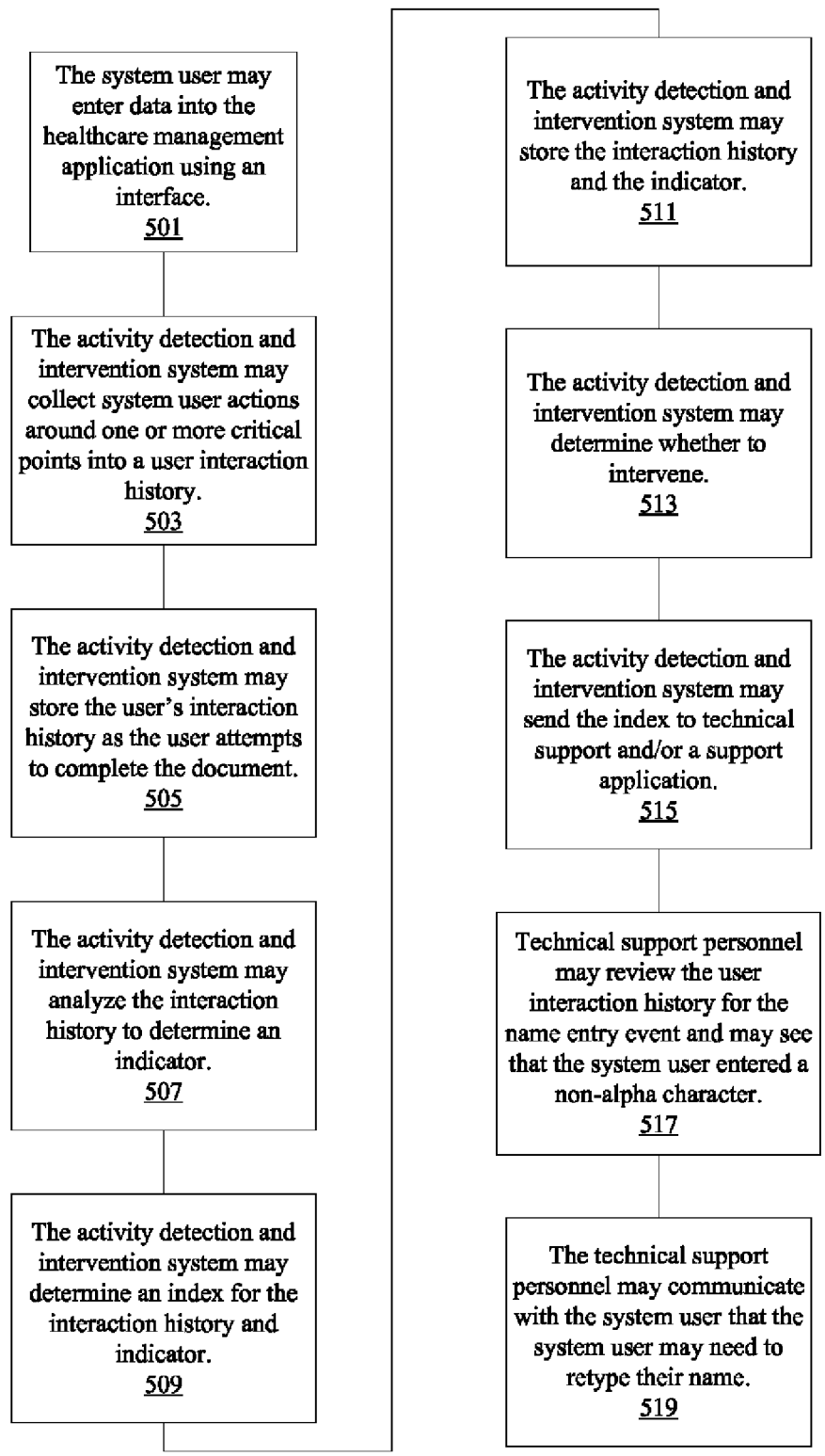
FIG. 5 illustrates an embodiment of the activity detection and intervention system monitoring a user's interactions with the healthcare management application and providing a user remedy.

FIG. 5 illustrates an example of the activity detection and intervention system 132 monitoring a user's interactions with the healthcare management application 100A and providing a solution to the system user 130. It should be noted that in various embodiments of the methods described below, one or more of the elements described may be performed concurrently, in a different order than shown, or may be omitted entirely. Other additional elements may also be performed as desired.

At 501, a system user 130 may enter data into the healthcare management application 100A using interface 650 (e.g., the system user 130 may attempt to enter their name into field 622A). FIG. 6 illustrates an exemplary, generic display and user interface that may be provided by the healthcare management application 100A according to one embodiment. Interface 650 may include one or more of a menu bar 652, a tool bar 654, and a tab bar 656. Menu bar 652 may provide one or more menus for accessing various functionalities of healthcare management application 100A with system user-selectable interface items (menu selections). Tool bar 654 may provide one or more tool icons for accessing various tools of healthcare management application 100A. Tab bar 656 may provide one or more tabs for switching between various views presented to the system user 130. The currently selected tab displays forms for various modules. The system user interface may provide one or more user interface items for selecting among modules and among electronic documents of selected modules. As an example, the Forms tab includes, on the left, a selection area to select a module from a list of modules. Module 1 is shown in bold text to indicate that it is currently selected. The Forms tab may also include a selection area to select a form (electronic document) of a selected module from a list of forms for the module. Form 1 is shown in bold text to indicate that it is currently selected. The Forms tab displays a current healthcare document 620 (Form 1). Note that these user interface items are exemplary, and that a person skilled in the art will recognize that other user interface mechanisms and items may be used to select among modules and forms. Further note that current healthcare document 620 is intended to be representative of both healthcare information 220 documents presented as templates for data entry by the system user 130 and data entry displays that include input fields for entering data and information to be transferred into healthcare information documents.

Current healthcare document 620 may include multiple fields 622. These fields 622 may include fields that need to be entered by the system user 130 via the system user interface, fields for which values may be transferred from prior healthcare information or from other documents in the current healthcare information 220, and/or fields that may include values that need to be calculated. Calculated values may be calculated from one or more other values, including values transferred from prior healthcare information, values entered by the system user 130 via the system user interface, and values from other fields 622 or other documents. In some cases, calculated values displayed in one field 622 may be used in calculating a value for another field 622.

At 503, the activity detection and intervention system 132 may collect system user actions around one or more critical points into a user interaction history 141. For example, technical support personnel may have defined attempted completion of field 622A (i.e., "Full Name" field) as a critical point. As another example, the attempted completion of the entire health document 620 may be defined as a critical point.

At 505, the activity detection and intervention system 132 may store the user interaction history 141 (e.g., in real time as the system user 130 is attempting to complete the document 620). As an example, the user interaction history 141 may include: (1) User clicked on field 622A; (2) User entered "Jo#n Doe"; (3) User pressed *Enter*; and (4) Error message was returned—"Illegal character used in name". Other ways of recording the user interaction history 141 are also contemplated. For example, the user interaction history 141 may include only the system user's inputs and the system's responses.

At 507, the activity detection and intervention system 132 may analyze the user interaction history 141 to determine an indicator 140. The indicator 140 may be determined, for example, by analyzing the user interaction history 141 in view of the other user interaction histories 141 or analyzing the user interaction history 141 using one or more rulesets. For example, a normal user interaction history for the particular healthcare document (e.g., which may include the entry of all alpha characters in the name field) may be compared to the system user's current user interaction history 141 (which, in this example, indicates a non-alpha character) to detect if a deviation from the normal user interaction history exists. In this example, the deviation may include the fact that a non-alpha character was typed. The deviation may also include the fact that an error was returned. An indicator 140 may be determined based on the deviations. For example, incorrect character types may affect the indicator by −5 and an error message may affect the indicator by −5 (for a total indicator of −10). In some embodiments, rulesets may be used to determine an indicator 140. For example, rules may effectively include "If incorrect character type, indicator=indicator−5" and "If error message, indicator=indicator−5". In this example, the threshold may equal −10 (e.g., with an initial indicator of 0). Other rules are also contemplated.

At 509, the activity detection and intervention system 132 may determine (and assign) an index 143 for the user interaction history 141 and/or indicator 140. For example, the index 143 may be a "ticket" assigned to the each user interaction history 141 and/or indicator 140 for a user event. In some embodiments, a look-up table may be maintained that associates each index 143 with its respective user interaction history 141 and/or indicator 140.

At 511, the activity detection and intervention system 132 may store the user interaction history 141 and the indicator 140. In some embodiments, the user interaction history 141 and indicator 140 may be stored with their index 143 and/or according to their index 143.

At 513, the activity detection and intervention system 132 may determine whether to intervene. For example, the activity detection and intervention system 132 may determine if the indicator 140 is above a positive threshold or below a negative threshold. For example, the lower threshold may be −7. In this example, the activity detection and intervention system 132 may compare the −10 indicator to a threshold of −7 and determine that the system should intervene (or communicate the need to intervene to another entity). In some embodiments, the activity detection and intervention system 132 may not determine whether to intervene.

At 515, the activity detection and intervention system 132 may send the index 143 to technical support and/or a support application 100. The technical support and/or support application 100 may use the index 143 to request the indicator 140 and/or user interaction history 141 to review them while assisting the system user 130.

At 517, technical support personnel may review the user interaction history 141 for the name entry event and may see that the system user 130 entered a non-alpha character.

At 519, the technical support personnel may communicate with the system user 130 (e.g., through a pop-up window, phone call, instant message, email, etc.) that the system user 130 may need to retype their name. In some embodiments, a support entity 135 may analyze the user interaction history 141 and provide the suggestion to the system user 130.

Figure 7:
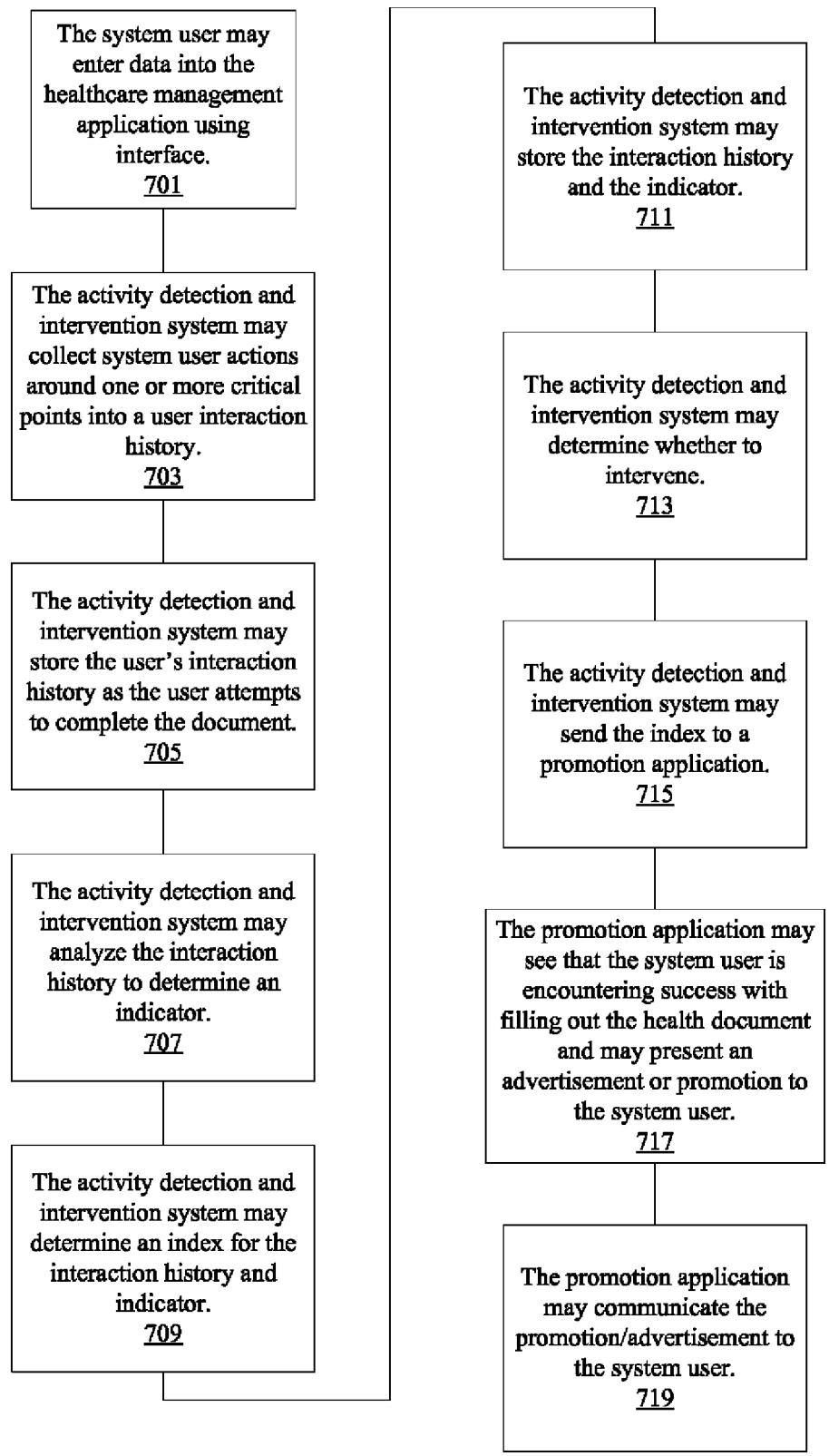
FIG. 7 illustrates an embodiment of the activity detection and intervention system monitoring a user's interactions with the healthcare management application 100A and providing a user promotion.

FIG. 7 illustrates an example of the activity detection and intervention system 132 monitoring a user's interactions with the healthcare management application 100A and providing a user promotion. It should be noted that in various embodiments of the methods described below, one or more of the elements described may be performed concurrently, in a different order than shown, or may be omitted entirely. Other additional elements may also be performed as desired.

At 701, a system user 130 may enter data into the healthcare management application 100A using interface 650. For example, the system user 130 may enter the name of the system user's primary health plan provider in field 622F.

At 703, the activity detection and intervention system 132 may collect system user actions around one or more critical points into a user interaction history 141.

At 705, the activity detection and intervention system 132 may store the user interaction history 141 (e.g., in real time as the system user 130 is attempting to complete the document 620). As an example, the user interaction history 141 may include: (1) User clicked one field 622F; (2) User entered "Health Plan Provider, Inc."; and (3) User pressed *Enter*.

At 707, the activity detection and intervention system 132 may analyze the user interaction history 141 to determine an indicator 140. In some embodiments, rulesets may be used to determine an indicator 140. For example, rules may effectively include "If user successfully enters text into field 622F, indicator=indicator+10" and "If error message, indicator=indicator−5". In this example, the threshold may equal +10 (e.g., with an initial indicator of 0). Other rules are also contemplated.

At 709, the activity detection and intervention system 132 may determine an index 143 for the user interaction history 141 and indicator 140.

At 711, the activity detection and intervention system 132 may store the user interaction history 141 and the indicator 140. In some embodiments, the user interaction history 141 and indicator 140 may be stored with their index 143 and/or according to their index 143.

At 713, the activity detection and intervention system 132 may determine whether to intervene. For example, the activity detection and intervention system 132 may determine if the indicator 140 is above a positive threshold or below a negative threshold. For example, the upper threshold may be +7. In this example, the activity detection and intervention system 132 may compare the +10 indicator to a threshold of +7 and determine that the system may intervene (or communicate the need to intervene to another entity). In some embodiments, the activity detection and intervention system 132 may not determine whether to intervene.

At 715, the activity detection and intervention system 132 may send the index 143 to a promotion application.

At 717, the promotion application may see that the system user 130 is encountering success with filling out the health document and may present an advertisement or promotion to the system user 130. In some embodiments, the promotion application may review the user interaction history 141 and/or indicator 140 to determine if and what type of advertisements/promotions are appropriate for the system user 130. As an example, a pop window with an advertisement for a different health plan provider may be presented to the system user 130. In some embodiments, if the indicator 140 was below the positive threshold, the system may refrain from presenting an advertisement (e.g., to prevent discouraging the system user 130). In some embodiments, promotions (and/or advertisements) may be presented to a system user 130 if their indicator is below a lower threshold (e.g., a discount on their subscription fees).

At 719, the promotion application may communicate the promotion/advertisement to the system user 130 (e.g., through a pop-up window, phone call, instant message, email, etc.).

In some embodiments, the activity detection and intervention system 132 may be a stand-alone system (e.g., to externally monitor an application 100) or may be embedded in an application 100 (e.g., the healthcare management application 100A). For example, the activity detection and intervention system 132 may include infrastructure on top of a message layer that monitors application messages or may be directly embedded in the application logic. In some embodiments, the activity detection and intervention system 132 may be configured to monitor a specific application or may monitor several applications (e.g., most of the applications being used on a system user's local computer). Various components of embodiments of an activity detection and intervention system 132 as described herein may be executed on one or more computer systems, which may interact with various other devices. One such computer system is illustrated by FIG. 8. In the illustrated embodiment, computer system 800 includes one or more processors 810 coupled to a system memory 820 via an input/output (I/O) interface 830. Computer system 800 further includes a network interface 840 coupled to I/O interface 830, and one or more input/output devices 850, such as cursor control device 860, keyboard 870, audio device 890, and display(s) 880. In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions and/or data accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for the activity detection and intervention system 132, are shown stored within system memory 820 as program instructions 825 and data storage 835, respectively. In other embodiments, program instructions and/or data may be received, sent or stored upon different types of computer-accessible media or on similar media separate from system memory 820 or computer system 800. Generally speaking, a computer-accessible medium may include storage media or memory media such as magnetic or optical media, e.g., disk or CD/DVD-ROM coupled to computer system 800 via I/O interface 830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840.

In some embodiments, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. In addition, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, or between nodes of computer system 800. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or retrieving data by one or more computer system 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

As shown in FIG. 8, memory 820 may include program instructions 825, configured to implement at least a portion of embodiments of the activity detection and intervention system 132 as described herein, and data storage 835, comprising various documents, tables, databases, etc. accessible by program instructions 825. In some embodiments, program instructions 825 may include software elements of the activity detection and intervention system 132 illustrated in the FIGs., and data storage 835 may include data used in embodiments of the activity detection and intervention system 132. In other embodiments, different software elements and data may be included.

Those skilled in the art will appreciate that computer system 800 is merely illustrative and is not intended to limit the scope of the activity detection and intervention system 132 as described herein. In particular, the computer system and devices may include any combination of hardware or software that can perform the indicated functions, including computers, network devices, internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   collecting a first user interaction history comprising one or more user actions or system responses as a user uses an application;
   associating an indicator with the first user interaction history that indicates a degree of positive or negative interaction of the user with respect to one or more user actions or system responses in the first user interaction history, the degree of positive or negative interaction being at least partly representative of success or failure of the user in performing at least one of the one or more user actions in the first user interaction history as determined by comparing the first user interaction history with a second user interaction history;
   assigning an index to reference the first user interaction history or indicator;
   storing the first user interaction history and indicator according to the index; and
   providing the index to a support entity, wherein the first user interaction history and indicator are operable to be provided to the support entity when referenced by the index;
   comparing the indicator to a threshold; and
   providing an indication to the support entity if the indicator exceeds the threshold;
   wherein collecting a first user interaction history, associating an indicator, assigning an index, storing the first user interaction history and indicator, and providing the index to a support entity are performed while the user uses the application.

2. The computer-implemented method as recited in claim 1, wherein the first user interaction history is stored in a storage system and is accessible through the index.

3. The computer-implemented method as recited in claim 1, wherein the support entity uses the first user interaction history to provide user support while the user is using the application.

4. The computer-implemented method as recited in claim 1, wherein the first user interaction history is used to determine whether to provide a promotion or advertisement to the system user.

5. The computer-implemented method as recited in claim 1, wherein the first user interaction history is collected at a predefined critical point in an application.

6. A system, comprising:
one or more processors;
a display device coupled to the one or more processors; and
a memory coupled to the one or more processors, wherein the memory comprises program instructions executable by the one or more processors to implement a computer application and a mechanism, wherein the mechanism is configured to:
collect a first user interaction history comprising one or more user actions or system responses as a user uses an application;
associate an indicator with the first user interaction history that indicates a degree of positive or negative interaction of the user with respect to one or more user actions or system responses in the first user interaction history, the degree of positive or negative interaction being at least partly representative of success or failure of the user in performing at least one of the one or more user actions in the first user interaction history as determined by comparing the first user interaction history with a second user interaction history;
assign an index to reference the first user interaction history or indicator;
store the first user interaction history and indicator according to the index;
provide the index to a support entity, wherein the first user interaction history and indicator are operable to be provided to the support entity when referenced by the index;
comparing the indicator to a threshold; and
providing an indication to the support entity if the indicator exceeds the threshold;
wherein collecting a first user interaction history, associating an indicator, assigning an index, storing the first user interaction history and indicator, and providing the index to a support entity are performed while the user uses the application.

7. The system as recited in claim 6, wherein the first user interaction history is stored in a storage system and is accessible through the index.

8. The system as recited in claim 6, wherein the support entity uses the first user interaction history to provide user support while the user is using the application.

9. The system as recited in claim 6, wherein the first user interaction history is used to determine whether to provide a promotion or advertisement to the system user.

10. The system as recited in claim 6, wherein at least a portion of the first user interaction history is collected at a predefined critical point in an application.

11. A system, comprising:
a client system configured to couple to a network, wherein the client system comprises an instance of a particular computer application, wherein the particular computer application is configured to collect a first user interaction history comprising one or more user actions or system responses as a user uses the application and wherein the application is further configured to associate an indicator with the first user interaction history that indicates a degree of positive or negative interaction of the user with respect to one or more user actions or system responses in the first user interaction history, the degree of positive or negative interaction being at least partly representative of success or failure of the user in performing at least one of the one or more user actions in the first user interaction history as determined by comparing the first user interaction history with a second user interaction history; and
a storage system configured to couple to the network, wherein the storage system is configured store the first user interaction history and indicator according to an index;
wherein the storage system is further configured to return the index to the client system;
wherein the index may be provided to a support entity, and wherein the first user interaction history and indicator are operable to be provided to the support entity when referenced by the index;
the client system being further configured to compare the indicator to a threshold and provide an indication to the support entity if the indicator exceeds the threshold;
wherein collecting a first user interaction history, associating an indicator, assigning an index, storing the first user interaction history and indicator, and providing the index to a support entity are performed while the user uses the application.

12. The system as recited in claim 11, wherein the first user interaction history is stored in a storage system and is accessible through the index.

13. The system as recited in claim 11, wherein the support entity uses the first user interaction history to provide user support while the user is using the application.

14. The system as recited in claim 11, wherein the first user interaction history is used to determine whether to provide a promotion or advertisement to the system user.

15. The system as recited in claim 11, wherein the first user interaction history is collected at a predefined critical point in an application.

16. A computer-accessible storage medium, comprising program instructions, wherein the program instructions are computer-executable to implement:
collect a first user interaction history comprised of one or more user actions or system responses as a user uses an application;
associate an indicator with the first user interaction history that indicates a degree of positive or negative interaction of the user with respect to one or more user actions or system responses in the user interaction history, the degree of positive or negative interaction being at least partly representative of success or failure of the user in performing at least one of the one or more user actions in the first user interaction history as determined by comparing the first user interaction history with a second user interaction history;
assign an index to reference the first user interaction history or indicator;
store the first user interaction history and indicator according to the index;
provide the index to a support entity, wherein the first user interaction history and indicator are operable to be provided to the support entity when referenced by the index;

compare the indicator to a threshold; and
provide an indication to the support entity if the indicator exceeds the threshold;
wherein collecting a first user interaction history, associating an indicator, assigning an index, storing the first user interaction history and indicator, and providing the index to a support entity are performed while the user uses the application.

17. The computer-accessible storage medium as recited in claim 16, wherein the first user interaction history is stored in a storage system and is accessible through the index.

18. The computer-accessible storage medium as recited in claim 16, wherein the support entity uses the first user interaction history to provide user support while the user is using the application.

19. The computer-accessible storage medium as recited in claim 16, wherein the first user interaction history is used to determine whether to provide a promotion or advertisement to the system user.

20. The computer-accessible storage medium as recited in claim 16, wherein the first user interaction history is collected at a predefined critical point in an application.

21. A computer-implemented method, comprising:
    collecting a first user interaction history comprising one or more user actions or system responses as a user uses an application;
    associating an indicator with the first user interaction history that indicates a degree of positive or negative interaction of the user with respect to one or more user actions or system responses in the first user interaction history, the degree of positive or negative interaction being at least partly representative of success or failure of the user in performing at least one of the one or more user actions in the first user interaction history as determined by comparing the first user interaction history with a second user interaction history;
    assigning an index to reference the first user interaction history or indicator;
    storing the first user interaction history and indicator according to the index;
    providing the index to a support entity, wherein the first user interaction history and indicator are operable to be provided to the support entity when referenced by the index;
    comparing the indicator to a threshold; and
    providing an indication to the support entity if the indicator exceeds the threshold;
    wherein the first user interaction history includes one or more of system user enrollment, adding system user information, and printing information.

22. A system, comprising:
    one or more processors;
    a display device coupled to the one or more processors; and
    a memory coupled to the one or more processors, wherein the memory comprises program instructions executable by the one or more processors to implement a computer application and a mechanism, wherein the mechanism is configured to:
    collect a first user interaction history comprising one or more user actions or system responses as a user uses an application;
    associate an indicator with the first user interaction history that indicates a degree of positive or negative interaction of the user with respect to one or more user actions or system responses in the first user interaction history, the degree of positive or negative interaction being at least partly representative of success or failure of the user in performing at least one of the one or more user actions in the first user interaction history as determined by comparing the first user interaction history with a second user interaction history;
    assign an index to reference the first user interaction history or indicator;
    store the first user interaction history and indicator according to the index;
    provide the index to a support entity, wherein the first user interaction history and indicator are operable to be provided to the support entity when referenced by the index;
    comparing the indicator to a threshold; and
    providing an indication to the support entity if the indicator exceeds the threshold;
    wherein the first user interaction history includes one or more of system user enrollment, adding system user information, and printing information.

23. A system, comprising:
    a client system configured to couple to a network, wherein the client system comprises an instance of a particular computer application, wherein the particular computer application is configured to collect a first user interaction history comprising one or more user actions or system responses as a user uses the application and wherein the application is further configured to associate an indicator with the first user interaction history that indicates a degree of positive or negative interaction of the user with respect to one or more user actions or system responses in the first user interaction history, the degree of positive or negative interaction being at least partly representative of success or failure of the user in performing at least one of the one or more user actions in the first user interaction history as determined by comparing the first user interaction history with a second user interaction history; and
    a storage system configured to couple to the network, wherein the storage system is configured store the first user interaction history and indicator according to an index;
    wherein the storage system is further configured to return the index to the client system;
    wherein the index may be provided to a support entity, and wherein the first user interaction history and indicator are operable to be provided to the support entity when referenced by the index;
    the client system being further configured to compare the indicator to a threshold and provide an indication to the support entity if the indicator exceeds the threshold;
    wherein the first user interaction history includes one or more of system user enrollment, adding system user information, and printing information.

24. A computer-accessible storage medium, comprising program instructions, wherein the program instructions are computer-executable to implement:
    collect a first user interaction history comprised of one or more user actions or system responses as a user uses an application;
    associate an indicator with the first user interaction history that indicates a degree of positive or negative interaction of the user with respect to one or more user actions or system responses in the user interaction history, the degree of positive or negative interaction being at least partly representative of success or failure of the user in performing at least one of the one or more user actions in the first user interaction history as determined by comparing the first user interaction history with a second user interaction history;

assign an index to reference the first user interaction history or indicator;

store the first user interaction history and indicator according to the index; and provide the index to a support entity, wherein the first user interaction history and indicator are operable to be provided to the support entity when referenced by the index comparing the indicator to a threshold; and providing an indication to the support entity if the indicator exceeds the threshold;

wherein the first user interaction history includes one or more of system user enrollment, adding system user information, and printing information.

* * * * *

UNITED STATES PATENT AND TRADEMARK OFFICE
CERTIFICATE OF CORRECTION

PATENT NO.       : 7,870,491 B1
APPLICATION NO.  : 11/741615
DATED            : January 11, 2011
INVENTOR(S)      : Kenneth Henderson and Terry F. LeClair It is certified that error appears in the above-identified patent and that said Letters Patent is hereby corrected as shown below:

In the Claims:

In Column 24, Line 12, Claim 11, between "configured" and "store" insert --to--;
In Column 26, Line 41, Claim 23, between "configured" and "store" insert --to--; and
In Column 27, Line 12, Claim 24, after "index;" delete "and".

Signed and Sealed this
Thirtieth Day of April, 2013

Teresa Stanek Rea
*Acting Director of the United States Patent and Trademark Office*